United States Patent
Izawa et al.

(10) Patent No.: US 11,286,181 B2
(45) Date of Patent: Mar. 29, 2022

(54) TREATMENT METHOD AND TREATMENT APPARATUS FOR WASTE WATER CONTAINING SULFURIC ACID, FLUORINE AND HEAVY METAL IONS

(71) Applicant: KURITA WATER INDUSTRIES LTD., Tokyo (JP)

(72) Inventors: Shuhei Izawa, Tokyo (JP); Ippei Tanaka, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 412 days.

(21) Appl. No.: 16/347,431

(22) PCT Filed: Sep. 12, 2017

(86) PCT No.: PCT/JP2017/032797
§ 371 (c)(1),
(2) Date: May 3, 2019

(87) PCT Pub. No.: WO2018/092396
PCT Pub. Date: May 24, 2018

(65) Prior Publication Data
US 2019/0276342 A1    Sep. 12, 2019

(30) Foreign Application Priority Data

Nov. 17, 2016   (JP) .............................. JP2016-224213

(51) Int. Cl.
*C02F 1/52* (2006.01)
*C02F 1/58* (2006.01)
(Continued)

(52) U.S. Cl.
CPC .............. *C02F 1/5209* (2013.01); *C02F 1/58* (2013.01); *C02F 1/583* (2013.01); *C02F 1/62* (2013.01);
(Continued)

(58) Field of Classification Search
None
See application file for complete search history.

(56) References Cited

U.S. PATENT DOCUMENTS

2014/0231359 A1*   8/2014   Cote ..................... C02F 1/60
                                                           210/710

FOREIGN PATENT DOCUMENTS

JP      S60-097090 A       5/1985
JP       62197192 A   *   8/1987
(Continued)

OTHER PUBLICATIONS

Machine translation of JP-62197192-A, pp. 1-3. (Year: 1987).*
(Continued)

*Primary Examiner* — Clare M Perrin
(74) *Attorney, Agent, or Firm* — Manabu Kanesaka

(57) ABSTRACT

A calcium fluoride precipitation inhibitor is added to waste water containing sulfuric acid, fluorine (fluoride ions and hydrogen fluoride) and heavy metal ions to generate pretreated water. A calcium compound is added to the pretreated water to generate a first insolubilized product at a pH of less than 5, followed by solid-liquid separation. A calcium compound is added to a first separated water after the solid-liquid separation to generate a second insolubilized product at a pH of 3 to 7 (provided that the pH is a pH higher than in the first reaction step), followed by solid-liquid separation. An alkali is added to a second separated water after the solid-liquid separation to give a pH of 8 or more, thereby generating a third insolubilized product, followed by solid-liquid separation.

10 Claims, 2 Drawing Sheets

(51) Int. Cl.
  *C02F 1/62*    (2006.01)
  *C02F 9/00*    (2006.01)
  *C02F 11/122*    (2019.01)
  *C02F 101/10*    (2006.01)
  *C02F 101/14*    (2006.01)
  *C02F 101/20*    (2006.01)
  *C02F 103/16*    (2006.01)
  *C02F 1/00*    (2006.01)

(52) U.S. Cl.
  CPC .............. *C02F 9/00* (2013.01); *C02F 11/122* (2013.01); *C02F 2001/007* (2013.01); *C02F 2101/101* (2013.01); *C02F 2101/14* (2013.01); *C02F 2101/20* (2013.01); *C02F 2103/16* (2013.01); *C02F 2209/06* (2013.01)

(56) References Cited

FOREIGN PATENT DOCUMENTS

| | | | |
|---|---|---|---|
| JP | S62-197192 A | | 8/1987 |
| JP | H07-188793 A | | 7/1995 |
| JP | 2007-196177 A | | 8/2007 |
| JP | 2007196177 A | * | 8/2007 |
| JP | 2011-200788 A | | 10/2011 |

OTHER PUBLICATIONS

Machine translation of JP2007-196177A, pp. 1-15. (Year: 2007).*
PCT/ISA/210, "International Search Report for International Application No. PCT/JP2017/032797," dated Nov. 14, 2017.
Japanese Office Action of 2016-224213, dated Nov. 7, 2017.

* cited by examiner

TREATMENT METHOD AND TREATMENT APPARATUS FOR WASTE WATER CONTAINING SULFURIC ACID, FLUORINE AND HEAVY METAL IONS

TECHNICAL FIELD

The present invention relates to a method and an apparatus for treating waste water containing sulfuric acid, fluorine (fluoride ions and hydrogen fluoride) and heavy metal ions. One aspect of the present invention relates to a method and an apparatus for treating waste water containing sulfuric acid, fluorine and heavy metals which enable recovery of materials containing calcium sulfate, calcium fluoride, and heavy metals with a low content of impurities.

Examples of the waste water include waste water discharged in the process of pickling stainless steel and waste water discharged in the production process of sulfuric acid by non-iron smelting.

BACKGROUND ART

In treatment of waste water containing sulfuric acid, fluorine and heavy metal ions, an alkaline agent containing calcium such as quicklime, calcium hydroxide and calcium carbonate is generally added to precipitate sulfate ions, fluorine ions and heavy metal ions in the waste water by reactions of formulas (1) to (3) and remove them. M in formula (3) represents heavy metal ions.

$$H_2SO_4 + Ca(OH)_2 \rightarrow CaSO_4 \cdot 2H_2O \quad (1)$$

$$2HF + Ca(OH)_2 \rightarrow CaF_2 + 2H_2O \quad (2)$$

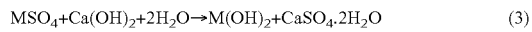

$$MSO_4 + Ca(OH)_2 + 2H_2O \rightarrow M(OH)_2 + CaSO_4 \cdot 2H_2O \quad (3)$$

Precipitates and sludge recovered by the aforementioned treatment method are desirably reused as resources. However, when an alkali is added to a solution containing metal ions such as iron, nickel and chromium together with fluorine, sulfuric acid, and the like to collectively precipitate metal components at once, a precipitate in which calcium sulfate (plaster), calcium fluoride, or the like is mixed with metal components is obtained. The precipitate thus obtained contains a large amount of sulfur components, though containing nickel and chromium that are valuable as iron and steel raw materials and calcium fluoride that can be used as a flux in refining operation depending on the circumstances. Therefore, a problem is that such a precipitate needs to be desulfurized for reuse as an iron and steel raw material or a flux, resulting in high cost. Further, another problem is that the amount of the precipitate used is limited due to the large amount of sulfur components.

As a method for solving such problems, Patent Literature 1 discloses a method for recovering a material containing heavy metals with a low concentration of sulfur components by adding calcium chloride into pickling waste water containing sulfuric acid, fluorine and heavy metal ions to react at a pH of 1 to 3, thereby generating a precipitate containing fluorine components and sulfur components, and neutralizing separated water obtained by solid-liquid separation of the precipitate.

Ptl1: Jph 07-188793 A

According to the method of Patent Literature 1, a sludge containing heavy metals can be obtained separately from calcium sulfate and calcium fluoride, while a sludge containing calcium sulfate and calcium fluoride mixed together is obtained. Therefore, a problem is that calcium sulfate and calcium fluoride cannot be separately recovered.

SUMMARY OF INVENTION

It is an object of the present invention to provide a method and an apparatus that enable recovery of sulfur components, fluorine components and heavy metal components, respectively, as a material containing calcium sulfate with low concentrations of fluorine components and heavy metal components, a material containing calcium fluoride with low concentrations of sulfur components and heavy metal components and a material containing heavy metals with low concentrations of fluorine components and sulfur components, from waste water containing sulfuric acid, fluorine and heavy metal ions.

In the method of the present invention, waste water containing sulfuric acid, fluorine and heavy metal ions is treated. The method of the present invention includes: a pretreatment step of adding a calcium fluoride precipitation inhibitor to the waste water to react with fluoride ions, thereby producing pretreated water; a first reaction step of adding at least one calcium compound selected from the group consisting of a calcium salt and calcium hydroxide to the pretreated water to generate a first insolubilized product at a pH of less than 5; a first solid-liquid separation step of subjecting the first insolubilized product to solid-liquid separation; a second reaction step of adding at least one calcium compound selected from the group consisting of a calcium salt and calcium hydroxide to a first separated water obtained in the first solid-liquid separation step to generate a second insolubilized product at a pH of 3 to 7 (provided that the pH is a pH higher than in the first reaction step); a second solid-liquid separation step of subjecting the second insolubilized product to solid-liquid separation; a third reaction step of adding an alkali to a second separated water obtained in the second solid-liquid separation step to give a pH of 8 or more, thereby generating a third insolubilized product; and a third solid-liquid separation step of subjecting the third insolubilized product to solid-liquid separation.

The apparatus of the present invention treats waste water containing sulfuric acid, fluorine ions and heavy metal ions. The apparatus of the present invention comprises: a pretreatment tank that comprises a calcium fluoride precipitation inhibitor-adding device and adds a calcium fluoride precipitation inhibitor to the waste water to react with fluoride ions, thereby producing pretreated water; a first reaction tank that adds at least one calcium compound selected from the group consisting of a calcium salt and calcium hydroxide to the pretreated water to generate a first insolubilized product at a pH of less than 5; a first solid-liquid separation device that subjects the first insolubilized product to solid-liquid separation; a second reaction tank that adds at least one calcium compound selected from the group consisting of a calcium salt and calcium hydroxide to a first separated water obtained in the first solid-liquid separation device to generate a second insolubilized product at a pH of 3 to 7 (provided that the pH is a pH higher than in the first reaction tank); a second solid-liquid separation device that subjects the second insolubilized product to solid-liquid separation; a third reaction tank that adds an alkali to a second separated water obtained in the second solid-liquid separation device to give a pH of 8 or more, thereby generating a third insolubilized product; and a third solid-liquid separation device that subjects the third insolubilized product to solid-liquid separation.

In one aspect of the present invention, the calcium fluoride precipitation inhibitor reacts with fluoride ions to generate a water-soluble fluorine-containing compound.

In one aspect of the present invention, the amount of the calcium fluoride precipitation inhibitor added in the pretreatment step is 0.5 to 5 times the equivalent weight of fluorine (fluoride ions and hydrogen fluoride) in the waste water.

In one aspect of the present invention, the method further comprises a first insolubilized product-reforming/returning step of adding at least part of the calcium compound added in the first reaction step to at least part of the first insolubilized product, followed by mixing, to supply the mixture to the first reaction step.

In one aspect of the present invention, the method further comprises at least one of a second insolubilized product-reforming/returning step of adding at least part of the calcium compound added in the second reaction step to at least part of the second insolubilized product, followed by mixing, to supply the mixture to the second reaction step; and a third insolubilized product-reforming/returning step of adding at least part of the calcium compound added in the third reaction step to at least part of the third insolubilized product, followed by mixing, to supply the mixture to the third reaction step.

Advantageous Effects of Invention

In the present invention, after a pretreatment in which a calcium fluoride precipitation inhibitor is added to waste water to react with fluoride ions, at least one calcium compound selected from the group consisting of a calcium salt and calcium hydroxide is added to generate calcium sulfate, thereby performing solid-liquid separation. Then, at least one calcium compound selected from the group consisting of a calcium salt and calcium hydroxide is added to a first separated water subjected to solid-liquid separation of calcium sulfate and thus having a reduced amount of sulfur components, and the mixture is subjected to reaction at a pH higher than in generation of calcium sulfate (however within the range of pH 3 to 7) to generate calcium fluoride, thereby performing solid-liquid separation. Further, an alkali is added to a second separated water subjected to solid-liquid separation of calcium fluoride and thus having a reduced amount of fluorine components, and the mixture is subjected to reaction at pH 8 or more that is higher than in generation of calcium fluoride to generate heavy metal hydroxides, thereby performing solid-liquid separation.

According to the method and the apparatus of the present invention as described above, sulfur components, fluorine components and heavy metal components in waste water can be recovered, respectively, as a material containing calcium sulfate with low concentrations of fluorine components and heavy metal components, a material containing calcium fluoride with low concentrations of sulfur components and heavy metal components and a material containing heavy metals with low concentrations of fluorine components and sulfur components.

DESCRIPTION OF EMBODIMENTS

Figure 1:
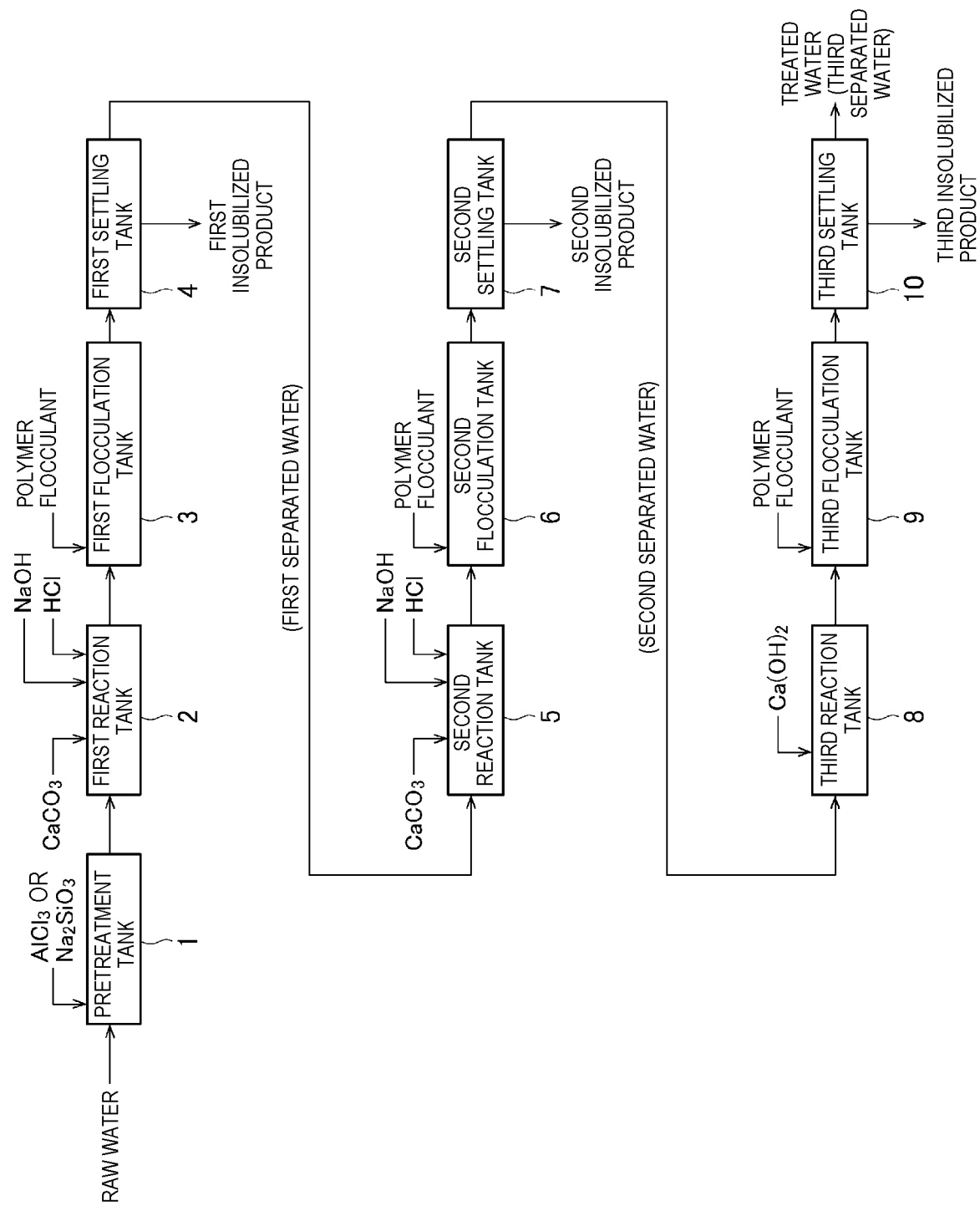
FIG. 1 is a flowchart showing an embodiment of the present invention.

Hereinafter, the present invention will be described further in detail.

<Raw Water>

In the present invention, examples of waste water containing sulfuric acid, fluorine and heavy metal ions that is a treatment target include waste water generally discharged in the process of pickling stainless steel and waste water discharged in the production process of sulfuric acid by non-iron smelting.

The quality of waste water that is suitable as raw water is as follows.

pH: 0.5 to 3
$SO_4$: 50,000 to 300,000 mg/L
F: 500 to 20,000 mg/L
Fe: 50 to 60,000 mg/L
Ni: 1 to 10,000 mg/L
Cu: 50 to 3,000 mg/L

<Pretreatment Step>

In the pretreatment step (which is performed in a pretreatment tank 1 in FIGS. 1 and 2), a calcium fluoride precipitation inhibitor is added to the waste water to react with fluoride ions. The calcium fluoride precipitation inhibitor is a compound that reacts with fluoride ions in acidic conditions to generate a water-soluble fluorine-containing compound.

As an example of the reaction to generate a water-soluble fluorine-containing compound under acidic conditions, there is a reaction to generate a complex containing fluorine by reaction of cations with fluoride ions, as shown in formulas (4) and (5) below. The complex generated by this reaction is dissolved in the pretreated water as ions in the waste water under strongly acidic conditions.

$$Al^{3+}+2F^- \rightarrow AlF_2^+ \qquad (4)$$

$$Fe^{3+}+2F^- \rightarrow FeF_2^+ \qquad (5)$$

Preferable examples of the calcium fluoride precipitation inhibitor used for this reaction include aluminum compounds such as polyaluminum chloride (PAC) and aluminum sulfate, and iron compounds such as iron(II) chloride and polyiron. The addition amount thereof is preferably 0.5 to 5 times, particularly preferably 0.8 to 2 times, the equivalent weight of fluorine (a fluoride and hydrogen fluoride) in the reaction formulas shown in formulas (4) and (5).

As another example of the reaction to generate a water-soluble fluorine-containing compound under acidic conditions, there is a reaction to generate a fluorine-containing compound by reaction of anions with fluoride ions, as shown in formulas (6) to (9) below. The fluorine-containing compound generated by this reaction is dissolved in the pretreated water partially as a compound and partially as dissociated ions in the waste water under strongly acidic conditions.

$$H_3PO_4+6HF \rightarrow HPF_6+4H_2O \qquad (6)$$

$$H_2SiO_3+6HF \rightarrow H_2SiF_6+3H_2O \qquad (7)$$

$$Ti(OH)_4+6HF \rightarrow H_2TiF_6+4H_2O \qquad (8)$$

$$B(OH)_3+4HF \rightarrow HBF_4+3H_2O \qquad (9)$$

Preferable examples of the calcium fluoride precipitation inhibitor used for this reaction include phosphoric acid, phosphates such as sodium phosphate and potassium phosphate, silicates such as sodium silicate and potassium silicate, and titanates such as sodium titanate and potassium titanate. Silicates are particularly preferable in view of the reaction efficiency. Further, the addition amount thereof is preferably 0.5 to 5 times, particularly preferably about 0.8 to 2 times, the equivalent weight of fluorine ions in the reaction formulas shown in formulas (6) to (9). The reaction time in the pretreatment step differs to some extent depending on the type of the calcium fluoride precipitation inhibitor but is preferably 2 to 60 minutes.

<First Reaction Step>

A first reaction step and a first solid-liquid separation step are performed after the pretreatment to suppress the precipitation of calcium fluoride by reacting the calcium fluoride precipitation inhibitor with fluorine ions as described above. Thereby, the content of fluorine compounds in a first insolubilized product separated in a first solid-liquid separation step can be reduced to 0.5 wt % or less as fluorine, and the purity of calcium sulfate (plaster) in the first insolubilized product can be enhanced (for example, to 90 wt % or more).

In the first reaction step (which is performed in a first reaction tank 2 in FIGS. 1 and 2), one or two or more calcium compounds selected from the group consisting of a calcium salt and calcium hydroxide is added to the pretreated water after the pretreatment step to react with sulfate ions, thereby generating the first insolubilized product mainly containing calcium sulfate.

The calcium salt is preferably calcium carbonate, calcium oxide or calcium chloride. The addition amount thereof is preferably 0.5 to 1 time, particularly preferably 0.8 to 1 time, the total equivalent weight of sulfuric acid and fluorine in the reaction formulas shown in formula (1) and formula (2).

As the reaction pH increases, fluorine ions in the waste water react with calcium ions to generate calcium fluoride, and the concentration of fluorine components contained in sludge increases. Therefore, the reaction pH is less than pH 5, particularly pH 1 to 3, preferably pH 1.2 to 2.5. As a pH adjuster, acids such as hydrochloric acid and sulfuric acid, alkali metal hydroxides such as sodium hydroxide and potassium hydroxide, or the like can be used other than the calcium compounds.

<First Solid-Liquid Separation Step>

Figure 2:
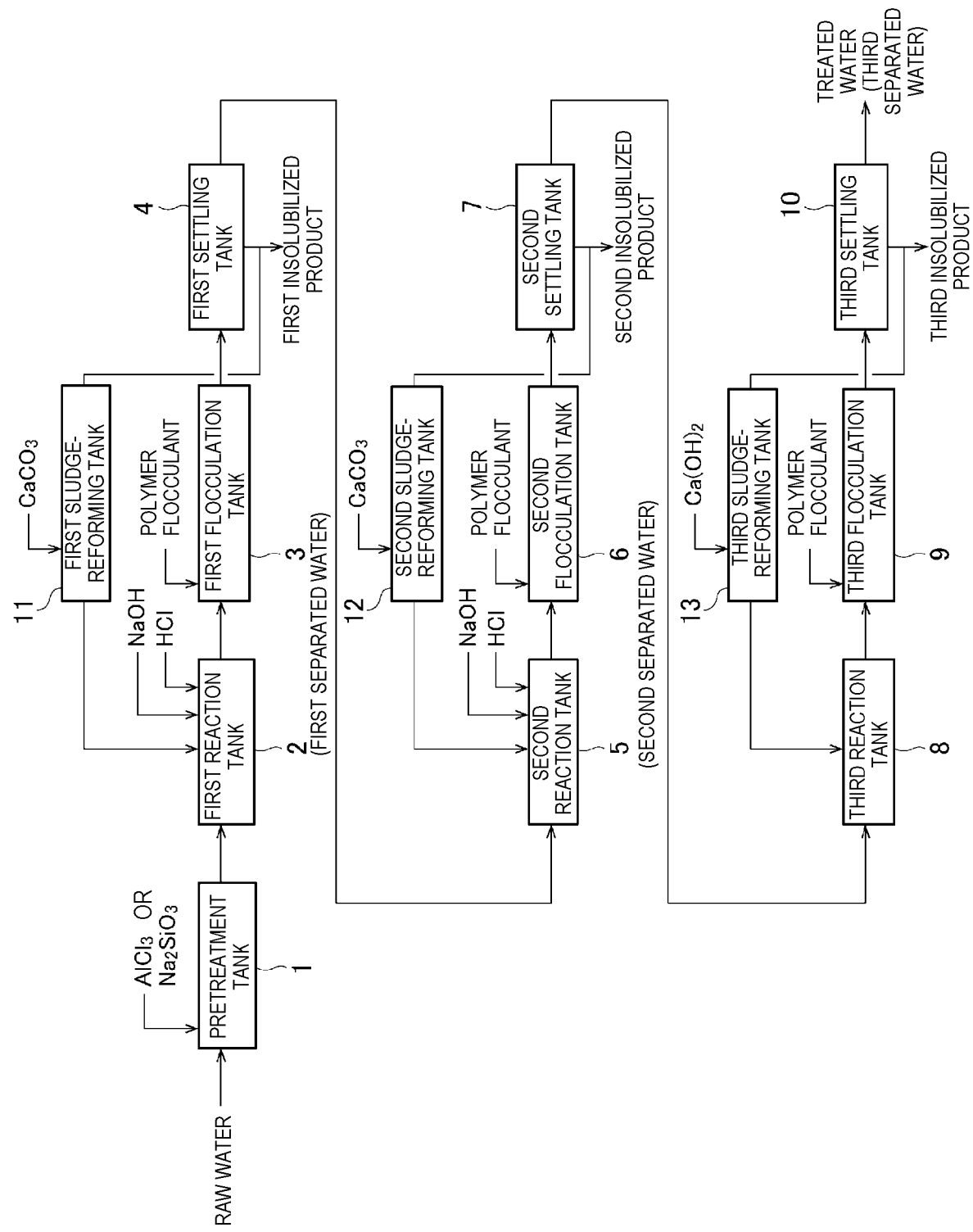
FIG. 2 is a flowchart showing another embodiment of the present invention.

In the first solid-liquid separation step (which is performed in a first flocculation tank 3 and a first settling tank 4 in FIGS. 1 and 2), the first insolubilized product generated in the first reaction step is subjected to solid-liquid separation, preferably after adding a polymer flocculant thereto. As the polymer flocculant, anionic polymer flocculants and the like are preferable. Other than the settling tank, a pressurized float tank, a filter press, a centrifugal dehydrator, and the like may be used for the solid-liquid separation.

<Second Reaction Step>

In the second reaction step (which is performed in a second reaction tank 5 in FIGS. 1 and 2), one or two or more calcium compounds selected from the group consisting of a calcium salt and calcium hydroxide is added to the first separated water subjected to solid-liquid separation in the first solid-liquid separation step to react, thereby generating a second insolubilized product mainly containing calcium fluoride.

The calcium salt is preferably calcium carbonate, calcium oxide or calcium chloride. The calcium salt is added so that the total amount of calcium compounds added in the first reaction step and the second reaction step is 1 time or more, for example, 1 to 2 times the total equivalent weight of sulfuric acid and fluorine in the raw water (waste water) (more preferably, so as to exceed the equivalent weight by 300 mg/L or more in terms of calcium).

The product of the solubility of calcium fluoride is generally represented by the following formula.

$$[F^-]_2[Ca^{2+}]=4.9\times10^{-11} \text{ mol}^3/L^3$$

However, the reaction does not reach the balance represented by the product of the solubility within the reaction time of the actual waste water treatment. Therefore, it is desirable that the calcium compounds are added so that the concentration of residual calcium ions in the treated water is 300 mg/L or more, in order to reduce the concentration of fluorine in the treated water as much as possible.

The precipitation of fluorine can be suppressed in the third reaction step by sufficiently precipitating fluorine in the second reaction step, so that the content of heavy metals in a third insolubilized product can be enhanced.

As the reaction pH approaches alkaline values, metal ions and hydroxide ions in the waste water react with each other to generate metal hydroxides, so that the concentration of heavy metals in the sludge increases. Therefore, the reaction pH is a pH of 3 to 7, preferably a pH of 3 to 6, particularly preferably a pH of 3 to 4.5 (provided that the pH is a pH higher than in the first reaction step). Preferable examples of pH adjusters include the aforementioned calcium compounds, acids such as hydrochloric acid and sulfuric acid, or alkali metal hydroxides such as sodium hydroxide and potassium hydroxide.

<Second Solid-Liquid Separation Step>

In the second solid-liquid separation step (which is performed in a second flocculation tank 6 and a second settling tank 7 in FIGS. 1 and 2), the second insolubilized product generated in the second reaction step is subjected to solid-liquid separation, preferably after adding a polymer flocculant thereto. As the polymer flocculant, anionic polymer flocculants and the like are preferable. Other than the settling tank, a pressurized float tank, a filter press, a centrifugal dehydrator, and the like may be used for the solid-liquid separation.

<Third Reaction Step>

In the third reaction step (which is performed in a third reaction tank 8 in FIGS. 1 and 2), an alkali is added to the second separated water subjected to solid-liquid separation in the second solid-liquid separation step to a pH of 8 or more, thereby generating an insolubilized product mainly containing metal hydroxides.

The pH is preferably pH 8 to 13, particularly preferably pH 10 to 12. Preferable examples of pH adjusters include calcium hydroxide and alkali metal hydroxides such as sodium hydroxide and potassium hydroxide.

<Third Solid-Liquid Separation Step>

In the third solid-liquid separation step (which is performed in a third flocculation tank 9 and a third settling tank 10 in FIGS. 1 and 2), the insolubilized product generated in the third reaction step is subjected to solid-liquid separation, preferably after adding a polymer flocculant thereto, so as to be separated into the third insolubilized product and a third separated water (treated water). As the polymer flocculant, anionic polymer flocculants and the like are preferable. Other than the settling tank, a pressurized float tank, a filter press, a centrifugal dehydrator, and the like may be used for the solid-liquid separation. The third separated water may be further highly treated.

<First to Third Sludge-Reforming/Returning Steps>

It is preferable in the present invention to perform the first to third sludge-reforming/returning steps where at least part of the first insolubilized product containing plaster, the second insolubilized product containing calcium fluoride and the third insolubilized product containing heavy metal hydroxides which have been separated by solid-liquid separation in the first to third solid-liquid separation steps are reformed, and the reformed parts are added to the first to third reaction steps, as shown in FIG. 2 (the reformation reaction is performed in first to third sludge-reforming tanks 11 to 13 in FIG. 2). In particular, it is preferable that the reformed insolubilized products are mixed with at least part of the calcium compounds to be added to the pretreated water, the first separated water or the second separated water, and the mixture is added to the first to third reaction tanks 2, 5 and 8. Thereby, the amount of sludge generated can be reduced, and the dehydration property of the generated sludge can be improved, while the quality of treated water can be further improved, due to the crystallization effect of the reformed sludge (insolubilized products).

<First to Third Dehydration Steps>

In the first to third dehydration steps (not shown), the first to third insolubilized products subjected to solid-liquid separation respectively in the first to third solid-liquid separation steps are each taken out and dehydrated by a dehydrator, which is not specifically limited, to obtain sludge with a low moisture content.

EXAMPLES

Hereinafter, Examples and Comparative Examples will be described.

Example 1

Waste water from the pickling step of stainless steel with the quality shown in Table 1 as raw water was subjected to treatment using the apparatus shown in FIG. 1. As a calcium fluoride precipitation inhibitor, aluminum chloride was used. As calcium compounds, calcium carbonate was used in the first and second reaction steps, and calcium hydroxide was used in the third reaction step. As a polymer flocculant, an anionic polymer flocculant "Kuriflock PA331" available from Kurita Water Industries Ltd. was used.

The treatment conditions in each tank are shown in Table 2. Further, the quality of the treated water obtained is shown in Table 3.

TABLE 1

| Item | Concentration (mg/L) |
|---|---|
| $SO_4$ | 150,000 |
| F | 3,600 |
| Cu | 100 |
| F | 35,000 |

TABLE 2

| Item | | | Example 1 | Example 2 | Example 3 | Comparative Example 1 |
|---|---|---|---|---|---|---|
| Pretreatment tank | HRT | (min) | 10 | 10 | 10 | — |
| | $AlCl_3$ | (mg-Al/L) | 2,600 | 2,600 | — | — |
| | $Na_2SiO_3$ | (mg-Si/L) | — | — | 900 | — |
| First reaction tank | HRT | (min) | 20 | 20 | 20 | 20 |
| | pH | (—) | 2.2 | 2.2 | 2.2 | 2.2 |
| | $CaCO_3$ | (mg/L) | 150,000 | 150,000 | 150,000 | 170,000 |
| First flocculation tank | HRT | (min) | 5 | 5 | 5 | 5 |
| | Polymer flocculant | (mg/L) | 10 | 10 | 10 | 10 |
| First settling tank | LV | (m/h) | 3 | 3 | 3 | 3 |
| Second reaction tank | HRT | (min) | 20 | 20 | 20 | — |
| | $CaCO_3$ | (mg/L) | 20,000 | 20,000 | 20,000 | — |
| | pH | (—) | 4.0 | 4.0 | 4.0 | — |
| Second flocculation tank | HRT | (min) | 5 | 5 | 5 | — |
| | Polymer flocculant | (mg/L) | 3 | 3 | 3 | — |
| Second settling tank | LV | (m/h) | 3 | 3 | 3 | — |
| Third reaction tank | HRT | (min) | 20 | 20 | 20 | — |
| | pH | (—) | 11 | 11 | 11 | 11 |
| Third flocculation tank | HRT | (min) | 5 | 5 | 5 | 5 |
| | Polymer flocculant | (mg/L) | 3 | 3 | 3 | 3 |
| Third settling tank | LV | (m/h) | 3 | 3 | 3 | 3 |

TABLE 3

| Item | | | Example 1 | Example 2 | Example 3 | Comparative Example 1 |
|---|---|---|---|---|---|---|
| First separated water | $SO_4$ | (mg/L) | 9,200 | 8,800 | 9,000 | 2,100 |
| | F | (mg/L) | 3,600 | 3,600 | 3,600 | 17 |
| | Cu | (mg/L) | 100 | 100 | 100 | 100 |
| | Fe | (mg/L) | 35,000 | 35,000 | 35,000 | 35,000 |

TABLE 3-continued

| | Item | | Example 1 | Example 2 | Example 3 | Comparative Example 1 |
|---|---|---|---|---|---|---|
| Second separated water | SO$_4$ | (mg/L) | 2,000 | 1,800 | 1,800 | — |
| | F | (mg/L) | 15 | 10 | 10 | — |
| | Cu | (mg/L) | 100 | 100 | 100 | — |
| | Fe | (mg/L) | 35,000 | 35,000 | 35,000 | — |
| Third separated water | SO$_4$ | (mg/L) | 1,800 | 1,800 | 1,800 | 1,900 |
| | F | (mg/L) | 13 | 10 | 10 | 14 |
| | Cu | (mg/L) | <1 | <1 | <1 | <1 |
| | Fe | (mg/L) | <1 | <1 | <1 | <1 |
| Sludge moisture content (after dehydration) | First insolubilized product | (wt %) | 24 | 8 | 8 | 25 |
| | Second insolubilized product | (wt %) | 37 | 22 | 24 | — |
| | Third insolubilized product | (wt %) | 75 | 51 | 51 | 75 |

It was recognized from Table 3 that most of SO$_4$ was removed from the first separated water after the first settling tank, but F, Cu and Fe were not substantially removed therefrom, and a calcium sulfate sludge with a low concentration of impurities (fluorine and heavy metals) was obtained. Further, it was recognized that most of F was removed from the second separated water, but Cu and Fe were not removed therefrom, and a calcium fluoride sludge with a low concentration of impurities was obtained. It was recognized that most of Cu and Fe were removed from the third separated water, and a heavy metal sludge with a low concentration of impurities was obtained.

Example 2

The same treatment as in Example 1 was performed except that the first to third insolubilized products were partially reformed and returned using the apparatus shown in FIG. 2. The return flow rate of the sludge was twice the flow rate of the raw water, and the treatment was performed so that the "return ratio" represented by the following formula was 20.

$$\text{Return ratio} = \frac{\text{Amount of returned solid (kg-dry/h)}}{\text{Amount of generated solid derived from raw water (kg-dry/h)}} \quad \text{[Expression 1]}$$

The total amount of calcium compounds supplied to the reaction tanks were added respectively to the sludge-reforming tanks. The treatment conditions of each tank are shown in Table 2. The quality of treated water obtained is shown in Table 3.

As shown in Table 3, a calcium sulfate sludge, a calcium fluoride sludge, and a heavy metal sludge with low concentrations of impurities were respectively obtained, in the same manner as in Example 1. Further, sludges with lower moisture contents in dehydrated cakes after dehydration were obtained, as compared with Example 1.

Example 3

The same treatment as in Example 2 was performed except that sodium silicate was used as a calcium fluoride precipitation inhibitor. The treatment conditions of each tank are shown in Table 2. Further, the quality of the treated water obtained is shown in Table 3. As shown in Table 3, a calcium sulfate sludge, a calcium fluoride sludge, and a heavy metal sludge with low concentrations of impurities were respectively obtained, in the same manner as in Examples 1 and 2. Further, sludges with lower moisture contents in dehydrated cakes after dehydration were obtained, as compared with Example 1.

Comparative Example 1

The same treatment as in Example 1 was performed except that the calcium fluoride precipitation inhibitor was not added. The treatment conditions of each tank are shown in Table 2. Further, the quality of the treated water obtained is shown in Table 3. As shown in Table 3, most of SO$_4$ and F were removed from the first separated water (the treated water in the first settling tank). Therefore, it was recognized that a calcium sulfate sludge containing a large amount of fluorine as impurities was generated.

Although the present invention has been described in detail using specific embodiments, it will be apparent to those skilled in the art that various modifications are possible without departing from the spirit and scope of the invention.

This application is based on JP 2016-224213 filed on Nov. 17, 2016, the entirety of which is incorporated by reference.

REFERENCE SIGNS LIST

1: Pretreatment tank
2, 5 and 8: Reaction tanks
3, 6 and 9: Flocculation tanks
4, 7 and 10: Settling tanks
11, 12 and 13: Sludge-reforming tanks

The invention claimed is:

1. A method for treating waste water containing sulfuric acid, fluorine and heavy metal ions, the method comprising:
   a pretreatment step of adding a calcium fluoride precipitation inhibitor to the waste water to react with fluoride ions, thereby producing pretreated water;
   a first reaction step of adding at least one calcium compound selected from the group consisting of a calcium salt and calcium hydroxide to the pretreated water to generate a first insolubilized product at a pH of less than 5;
   a first solid-liquid separation step of subjecting the first insolubilized product to solid-liquid separation;

a second reaction step of adding at least one calcium compound selected from the group consisting of a calcium salt and calcium hydroxide to a first separated water obtained in the first solid-liquid separation step to generate a second insolubilized product at a pH of 3 to 7 (provided that the pH is a pH higher than in the first reaction step);

a second solid-liquid separation step of subjecting the second insolubilized product to solid-liquid separation;

a third reaction step of adding an alkali to a second separated water obtained in the second solid-liquid separation step to give a pH of 8 or more, thereby generating a third insolubilized product; and a third solid-liquid separation step of subjecting the third insolubilized product to solid-liquid separation.

2. The method for treating waste water containing sulfuric acid, fluorine and heavy metal ions according to claim 1, wherein
the calcium fluoride precipitation inhibitor reacts with fluoride ions to generate a water-soluble fluorine-containing compound.

3. The method for treating waste water containing sulfuric acid, fluorine and heavy metal ions according to claim 1, wherein
the amount of the calcium fluoride precipitation inhibitor added in the pretreatment step is 0.5 to 5 times the equivalent weight of fluorine (a fluoride and hydrogen fluoride) in the waste water.

4. The method for treating waste water containing sulfuric acid, fluorine and heavy metal ions according to claim 1, further comprising
a first insolubilized product-reforming/returning step of adding at least part of the calcium compound added in the first reaction step to at least part of the first insolubilized product, followed by mixing, to supply a first mixture to the first reaction step.

5. The method for treating waste water containing sulfuric acid, fluorine and heavy metal ions according to claim 4, further comprising at least one insolubilized product-reforming/returning step of:
a second insolubilized product-reforming/returning step of adding at least part of the calcium compound added in the second reaction step to at least part of the second insolubilized product, followed by mixing, to supply a second mixture to the second reaction step; and
a third insolubilized product-reforming/returning step of adding at least part of the calcium compound added in the third reaction step to at least part of the third insolubilized product, followed by mixing, to supply a third mixture to the third reaction step.

6. The method for treating waste water containing sulfuric acid, fluorine and heavy metal ions according to claim 1, further comprising at least one dehydration/recovery step of:
a first dehydration/recovery step of subjecting the first insolubilized product separated in the first solid-liquid separation step to dehydration treatment to recover a material containing calcium sulfate;
a second dehydration/recovery step of subjecting the second insolubilized product separated in the second solid-liquid separation step to dehydration treatment to recover a material containing calcium fluoride; and
a third dehydration/recovery step of subjecting the third insolubilized product separated in the third solid-liquid separation step to dehydration treatment to recover a material containing heavy metals.

7. A treatment apparatus for waste water containing sulfuric acid, fluorine and heavy metal ions, comprising:
a pretreatment tank that comprises a calcium fluoride precipitation inhibitor-adding device and produces pretreated water by adding a calcium fluoride precipitation inhibitor to the waste water to react with fluoride ions;
a first reaction tank that adds at least one calcium compound selected from the group consisting of a calcium salt and calcium hydroxide to the pretreated water to generate a first insolubilized product at a pH of less than 5;
a first solid-liquid separation device that subjects the first insolubilized product to solid-liquid separation;
a second reaction tank that adds at least one calcium compound selected from the group consisting of a calcium salt and calcium hydroxide to a first separated water obtained in the first solid-liquid separation device to generate a second insolubilized product at a pH of 3 to 7 (provided that the pH is a pH higher than in the first reaction tank);
a second solid-liquid separation device that subjects the second insolubilized product to solid-liquid separation;
a third reaction tank that adds an alkali to a second separated water obtained in the second solid-liquid separation device to give a pH of 8 or more, thereby generating a third insolubilized product; and
a third solid-liquid separation device that subjects the third insolubilized product to solid- liquid separation,
wherein the treatment apparatus further comprises a first insolubilized product-reforming/returning device that adds at least part of the calcium compound added in the first reaction tank to at least part of the first insolubilized product, followed by mixing, to supply a first mixture to the first reaction tank.

8. The treatment apparatus for waste water containing sulfuric acid, fluorine and heavy metal ions according to claim 7, wherein
the calcium fluoride precipitation inhibitor-adding device is configured to add an amount of the calcium fluoride precipitation inhibitor 0.5 to 5 times the equivalent weight of fluorine (a fluoride and hydrogen fluoride) in the waste water.

9. The treatment apparatus for waste water containing sulfuric acid, fluorine and heavy metal ions according to claim 7, further comprising at least one insolubilized product-reforming/returning device of:
a second insolubilized product-reforming/returning device that adds at least part of the calcium compound added in the second reaction tank to at least part of the second insolubilized product, followed by mixing, to supply a second mixture to the second reaction tank; and
a third insolubilized product-reforming/returning device that adds at least part of the calcium compound added in the third reaction tank to at least part of the third insolubilized product, followed by mixing, to supply a third mixture to the third reaction tank.

10. The treatment apparatus for waste water containing sulfuric acid, fluorine and heavy metal ions according to claim 7, further comprising at least one dehydration/recovery device of:
a first dehydration/recovery device that subjects the first insolubilized product separated in the first solid-liquid separation device to dehydration treatment to recover a material containing calcium sulfate;

a second dehydration/recovery device that subjects the second insolubilized product separated in the second solid-liquid separation step to dehydration treatment to recover a material containing calcium fluoride; and
a third dehydration/recovery device that subjects the third insolubilized product separated in the third solid-liquid separation step to dehydration treatment to recover a material containing heavy metals.

\* \* \* \* \*